United States Patent
Julian et al.

(10) Patent No.: US 10,057,957 B2
(45) Date of Patent: Aug. 21, 2018

(54) VEHICLE LIGHT

(71) Applicants: Danial Julian, Athens, IL (US);
Zhongren Zhang, Springfield, IL (US);
Alek Cappelletti, McCordsville, IN (US)

(72) Inventors: Danial Julian, Athens, IL (US);
Zhongren Zhang, Springfield, IL (US);
Alek Cappelletti, McCordsville, IN (US)

(73) Assignee: XKGLOW INC., Athens, IL (US)

( * ) Notice: Subject to any disclaimer, the term of this patent is extended or adjusted under 35 U.S.C. 154(b) by 0 days.

(21) Appl. No.: 15/443,738

(22) Filed: Feb. 27, 2017

(65) Prior Publication Data

US 2018/0139819 A1    May 17, 2018

Related U.S. Application Data

(60) Provisional application No. 62/421,143, filed on Nov. 11, 2016.

(51) Int. Cl.
| | |
|---|---|
| *H05B 33/08* | (2006.01) |
| *B60Q 1/14* | (2006.01) |
| *B60Q 1/34* | (2006.01) |
| *B60Q 1/32* | (2006.01) |
| *F21S 41/141* | (2018.01) |
| *F21S 41/32* | (2018.01) |
| *B60Q 1/00* | (2006.01) |

(Continued)

(52) U.S. Cl.
CPC ....... *H05B 33/0857* (2013.01); *B60Q 1/0094* (2013.01); *B60Q 1/1415* (2013.01); *B60Q 1/32* (2013.01); *B60Q 1/34* (2013.01); *F21S 41/125* (2018.01); *F21S 41/141* (2018.01); *F21S 41/32* (2018.01); *F21S 41/65* (2018.01); *H05B 33/0845* (2013.01); *B60Q 2400/20* (2013.01); *F21S 41/194* (2018.01); *F21S 41/321* (2018.01); *F21Y 2113/10* (2016.08); *F21Y 2115/10* (2016.08)

(58) Field of Classification Search
CPC .... H05B 37/02; H05B 33/08; H05B 33/0857; H05B 33/0842; H05B 33/0845; B60Q 1/02; B60Q 1/04; B60Q 1/0408; B60Q 1/1415; B60Q 1/32; B60Q 1/34; B60Q 2400/20

See application file for complete search history.

(56) References Cited

U.S. PATENT DOCUMENTS

| | | |
|---|---|---|
| 3,759,084 A | 9/1973 | Plewka |
| 5,101,326 A | 3/1992 | Roney |

(Continued)

*Primary Examiner* — Thai Pham (57) ABSTRACT

A headlamp assembly may include a lamp body with a chip support. A color changing diode and a white diode may each be mounted on the chip support of the lamp body. The headlamp may also include a color input and a white input, the color input being in electrical communication with the color changing diode and the white input in electrical communication with the white diode. The headlamp may function such that an electrical input may be provided to the white input to cause illumination of the white diode and an electrical input to the color input may cause a controlled illumination of the color changing diode. The color changing diode may be a RGB diode, which may include the ability to illuminate the colors of red, green and blue in varied intensities of each color.

14 Claims, 6 Drawing Sheets

(51) Int. Cl.
  *F21S 41/125*     (2018.01)
  *F21S 41/65*      (2018.01)
  F21Y 115/10       (2016.01)
  F21Y 113/10       (2016.01)
  F21S 41/19        (2018.01)

(56) References Cited

U.S. PATENT DOCUMENTS

| | | |
|---|---|---|
| 5,158,350 A | 10/1992 | Sato |
| 5,567,036 A | 10/1996 | Theobald et al. |
| 5,595,438 A | 1/1997 | Burd |
| 5,685,637 A | 11/1997 | Chapman et al. |
| 6,193,400 B1 | 2/2001 | Schuster et al. |
| 6,471,368 B1 | 10/2002 | Lin |
| 6,619,829 B1 | 9/2003 | Chen |
| 7,055,999 B2 | 3/2006 | Lin |
| 7,144,144 B2 | 3/2006 | Hsu |
| 7,097,336 B2 | 8/2006 | Lin |
| 8,193,702 B2 | 6/2012 | Lenk et al. |
| 8,749,143 B1 | 6/2014 | Saddig et al. |
| 8,920,007 B2 | 12/2014 | Yang |
| 9,151,461 B1 | 10/2015 | Kuo et al. |
| 9,285,100 B2 | 2/2016 | Yao-Yuan et al. |
| 2017/0354001 A1* | 12/2017 | Yoo ................... H05B 37/02 |

* cited by examiner

VEHICLE LIGHT

CROSS-REFERENCE TO RELATED APPLICATION DATA

Priority is claimed under 35 U.S.C. § 119(e) to U.S. Provisional Application No. 62/421,143, filed on Nov. 11, 2016, which is incorporated by reference herein.

FIELD OF THE INVENTION

The present invention generally relates to vehicle lighting systems and, more particularly, to lighting elements for vehicles.

BACKGROUND OF THE INVENTION

Since the invention of the first automobile, increasing safety for the driver and the pedestrians has been a priority for automobile product manufacturers. A key element in this regard is headlamp technology for the vehicles. Vehicle headlamps may provide a clear view for the driver to negotiate the vehicle after dark, thus avoiding other vehicles, more clearly seeing the road ahead and avoiding any debris that may be present on the roadway. Pedestrians also benefit as the moving vehicle may be affixed with bright lights in the front of the vehicle, thereby visually alerting a person on the street or road as to the presence of the vehicle and the direction of movement.

In addition to safety, some people look at an automobile as an extension of them or their personality. This may include headlamps that can change color to enhance a beautiful paint job or interior work. This may be done purely for show, as it may be used in an official or impromptu car show, or additional color and color patterns may be used as a safety feature. This safety feature may include making the headlamps flash in a yellow color in concert with the turn signals or emergency flashers of the vehicle. The additional lighting may better alert the drivers of other vehicles to the condition or intended movement of a vehicle using the additional lighting.

It should, therefore, be appreciated that there is a need for a vehicle headlamp including additional color capabilities other than just white light that allows for use on a variety of electronic devices to control the headlamps. The present invention fulfills this need and others.

SUMMARY OF THE INVENTION

The present invention may include a vehicle headlamp with a lamp body including a chip support with a color changing light emitting diode (LED) and a white light emitting diode (LED), each mounted on the chip support of the lamp body. The headlamp may also include a color input and a white input, the color input being in electrical communication with the color changing light emitting diode (LED) and the white input in electrical communication with the white light emitting diode (LED). The combination may function such that an electrical input may be provided to the white input to cause illumination of the white light emitting diode (LED) and an electrical input to the color input may cause a controlled illumination of the color changing light emitting diode (LED). The color changing light emitting diode (LED) may be a RGB diode, which may include the ability to illuminate the colors of red, green and blue in varied intensities of each color in order to reach a variety of colors.

The vehicle light may include a lamp body including a chip support, a color changing light emitting diode (LED) and a white light emitting diode (LED) each mounted on the chip support of the lamp body. A color input (or first input) and a white input (or second input) may be included, the color input may be in electrical communication with the color changing light emitting diode (LED) and the white input may be in electrical communication with the white, light emitting diode (LED), whereby electrical input to the white input may cause illumination of the white light emitting diode (LED) and electrical input to the color input may cause a controlled illumination of the color changing light emitting diode (LED). The color changing light emitting diode (LED) and the white light emitting diode (LED) may be positioned proximate to one another, wherein one edge of the color light emitting diode (LED) may be in physical contact with one edge of the white light emitting diode (LED). If not physically touching, one edge of the color light emitting diode (LED) may be is less than 0.050 inches from one edge of the white light emitting diode (LED). The color changing light emitting diode (LED) may be a RGB (red, green, blue) diode which may include the ability to illuminate the colors of red, green and blue in varied intensities of each color. The color changing light emitting diode (LED) may also be comprised of separate red, blue and green diodes.

The headlamp may also be part of an assembly including a headlamp with a lamp body including a chip support. A color changing light emitting diode (LED) may be proximate a light emitting diode (LED) diode, both mounted to the chip support of the headlamp. An LED driver may be connected to the white light emitting diode (LED) and a vehicle plug may be connected to the LED driver, whereby a light output may be generated from the white light emitting diode (LED) by way of the LED driver through the vehicle plug, used as an interface to the automobile. A controller may be provided in electrical communication with the color changing light emitting diode (LED) of the headlamp. A switch and a relay may also be provided. The switch may be used to close the relay to provide a voltage input from a power source to the controller. The controller may provide a modulated electrical input to the color changing light emitting diode (LED), which may result in a light emission of the color changing light emitting diode (LED). A vehicle controller may be provided in electrical communication with a secondary light, which may be connected to the headlamp. The secondary light may be a light selected from a group comprising a turn signal and a clearance light, both may be located on the vehicle. The secondary light may be electrically connected to the color changing light emitting diode (LED) on the headlamp. A junction box with a power input and input from a controller may be provided, resulting in an output to at least one secondary light and an output to the color changing light emitting diode (LED) of the headlamp. For the remainder of this disclosure, the term "white diode" is considered synonymous with "white light emitting diode (LED)". Similarly, the term "color changing diode" is considered synonymous with "color changing light emitting diode (LED)".

For purposes of summarizing the invention and the advantages achieved over the prior art, certain advantages of the invention have been described herein. Of course, it is to be understood that not necessarily all such advantages can be achieved in accordance with any particular embodiment of the invention. Thus, for example, those skilled in the art will recognize that the invention can be embodied or carried out in a manner that achieves or optimizes one advantage or group of advantages as taught herein without necessarily achieving other advantages as may be taught or suggested herein.

All of these embodiments are intended to be within the scope of the invention herein disclosed. These and other embodiments of the present invention will become readily apparent to those skilled in the art from the following description of the preferred embodiments and drawings, the invention not being limited to any particular preferred embodiment(s) disclosed.

BRIEF DESCRIPTION OF THE DRAWINGS

Embodiments of the present invention will now be described, by way of example only, with reference to the following drawings, in which.

DETAILED DESCRIPTION OF THE INVENTION

Figure 1:
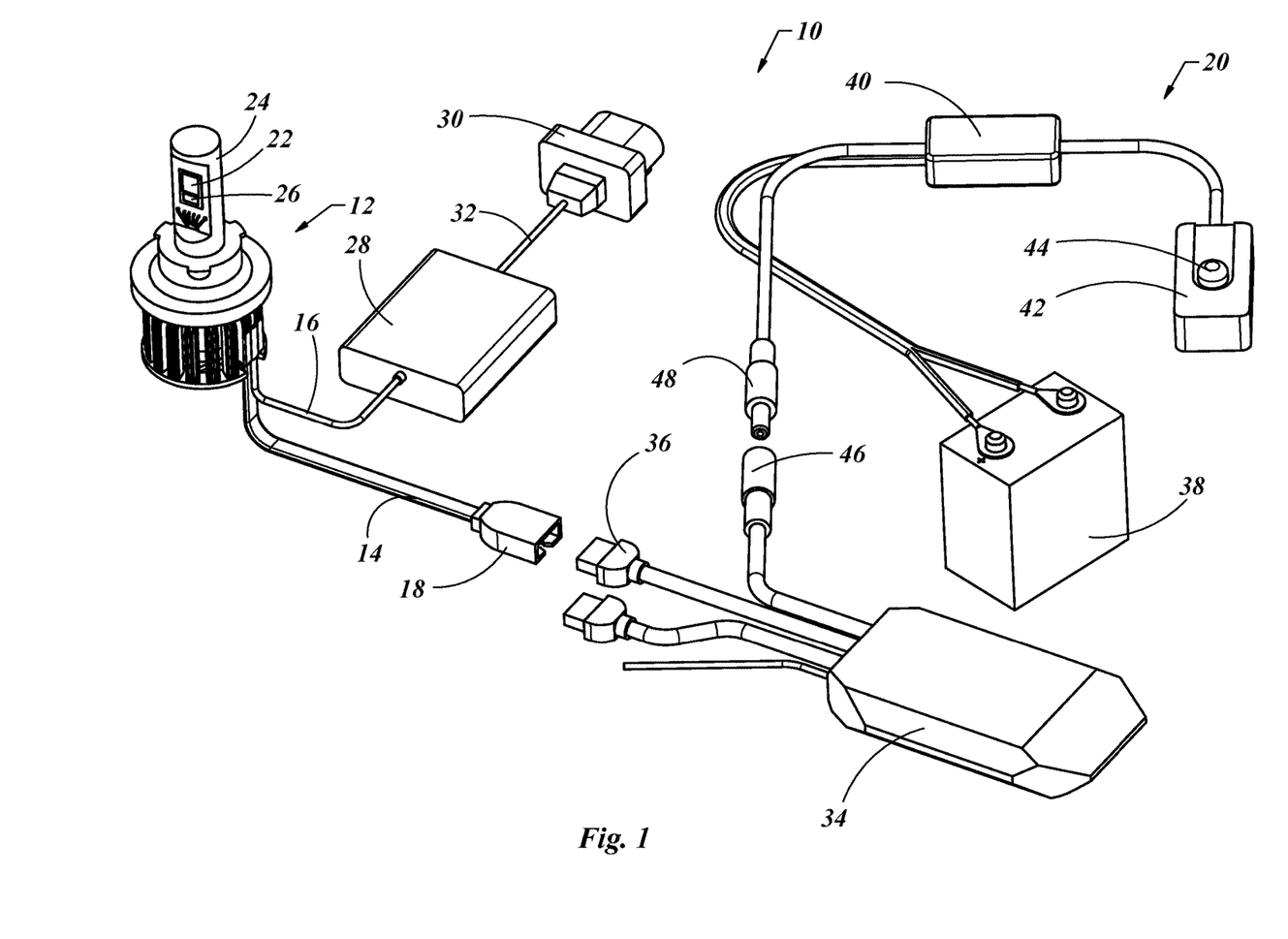
FIG. 1 is an isometric view of a headlamp assembly including a color controller, presented in accordance with the present invention.

With reference to the illustrative drawings, and particularly to FIG. 1, there is shown a vehicle headlight assembly 10. In this embodiment of the invention 10, a headlamp 12 may include a color input 14 and a white input 16. The color input 14 may include a controller plug 18, which may provide communication from a controller system 20 to a color changing diode 22 on the lamp body 24 of the headlamp 12. The white input 16 may be in electrical communication with a white diode 26, also on the lamp body 24 of the headlamp 12. The white input 16 may connect to an LED driver 28 such that an electrical input to illuminate the headlamp 12 in an automobile may be received by a vehicle plug 30. This electrical input may travel from the vehicle plug 30 through the connection wire 32 to the LED driver 28. The LED driver 28 may then provide a suitable output from the LED driver 28 into the white input 16 to result in a desired illumination of the white diode 26. The brightness of the white diode 26 may be brighter or dimmer as a factor of pulse width modulation (PWM) as generated by the LED driver 28.

The control system 20 may include a controller 34 with a plug 36, which may be received by the controller plug 18. In doing so, the controller 34 may provide a modulated electrical input to the color changing diode 22. The result may include a wide variety of red, green and blue (RGB) color combinations emitted from the color changing diode 22 on the headlamp 12. The controller 34 may be provided power by way of the vehicle battery 38. A locking relay 40 may be controlled by a switch 42. When a switch button 44 on the switch 42 is depressed, a circuit may be closed to the locking relay 40. Electrical communication between the controller 34 and the relay 40 may be provided by connecting the controller plug 46 to the switch plug 48. Then, when current flow from the battery 38 may be provided through the relay 40 in a closed position and continuous power may be provided from the battery 38 to the controller 34. To open the circuit between the battery 38 and the controller 34, the switch button 44 on the switch 42 may be depressed at any time when the relay 40 is closed. This may open the circuit by way of the relay 40 thus breaking electrical communication between the battery 38 and the controller 34.

Figure 2:
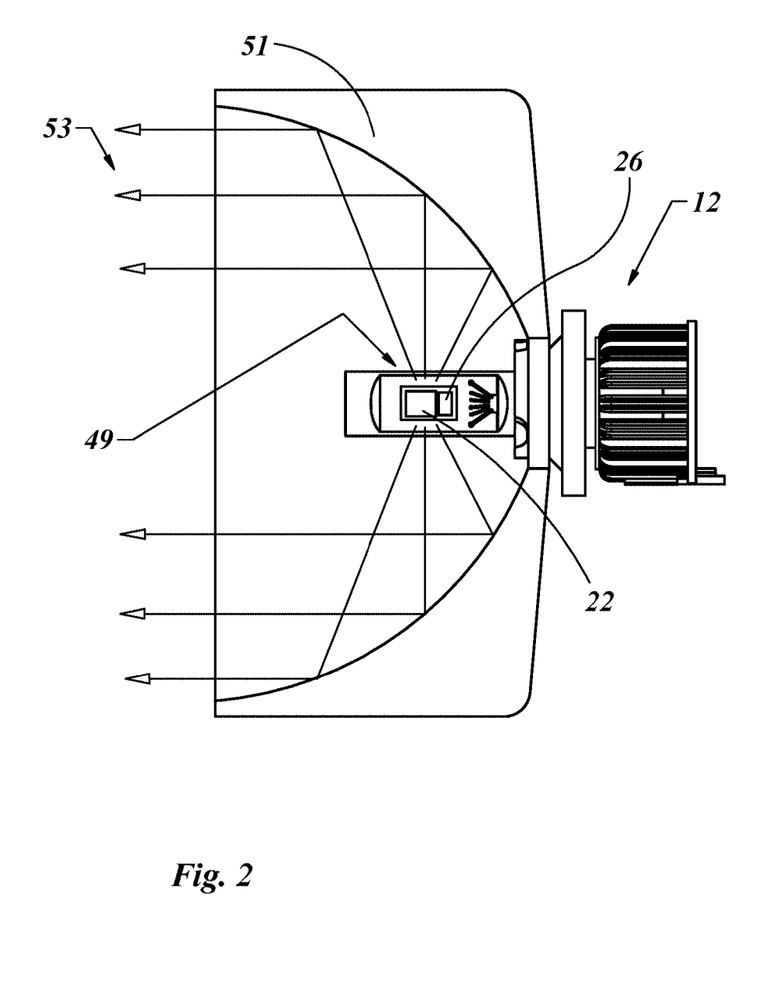
FIG. 2 is a side view of a headlamp presented in FIG. 1, as it may be used with a parabolic reflector of an automobile.

The proximal relative locations of the white diode 26 to the color changing diode 22 on the lamp body 24 of the headlamp 12 may be important in that one or more relatively consistently located light sources in the headlamp 12 may be close enough to take advantage of a single parabolic focal point 49 on a headlamp reflector 51. As is illustrated in FIG. 2, by placing the light source (22 and 26) at or very near the focal point 49 of a parabolic reflective lens 51, the resultant light output may be focused into a directed beam of light 53. This may be much more effective as a focused light source as may be used in a headlamp 12. If one of the light sources (22 or 26) produces light energy that is not at or near the focal point 49 of the parabolic shape of the lens 51, that portion of the light will not contribute to the directed beam of the light output. The result may be a less visible light output from the headlamp 12. This may provide an advantage over other systems with multiple light sources but are not positioned proximate to each other. The distance between the white diode 26 and the color changing diode 22 may vary somewhat depending on the design of the headlamp 12 and the headlamp reflector 51. In this embodiment the white diode 26 may be proximate to the color changing diode 22 in so far as an edge of the white diode 26 may physically touch an edge of the color changing diode 22 or have a gap between them of 0.050 inches or less. The relative proximity of the two light sources (26 and 22) may allow a substantial amount of the light emitted from both the white diode 26 and the color changing diode 22 to be located at or near the focal point of the headlamp reflector 51.

Figure 3:
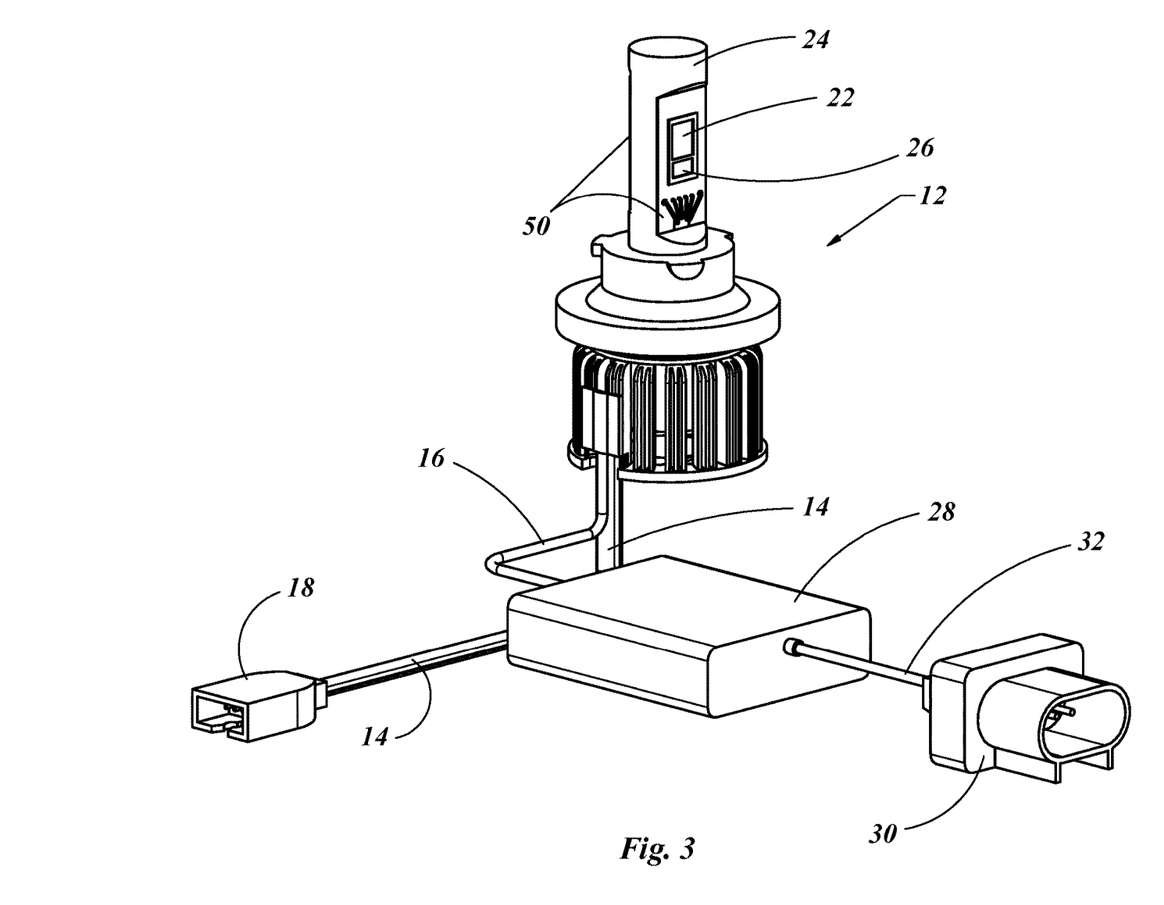
FIG. 3 is an isometric view of the headlamp assembly as presented in FIG. 1, without a color controller.
Figure 4:
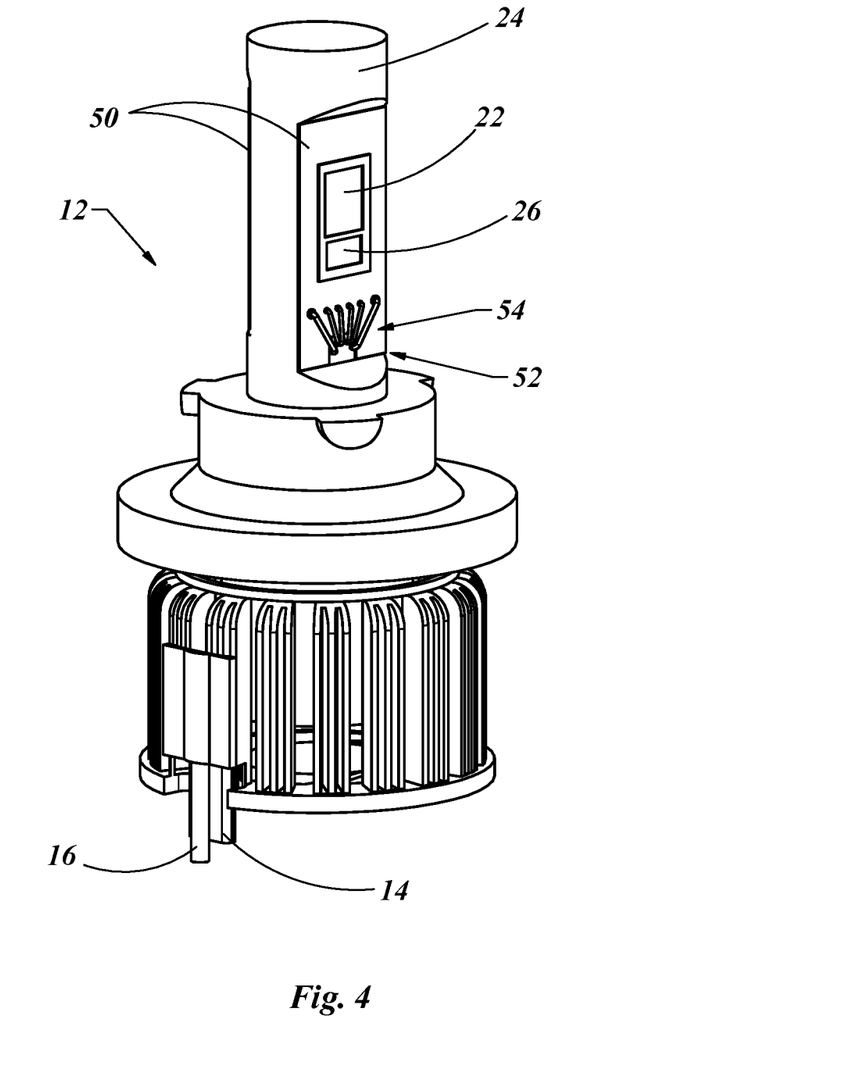
FIG. 4 is an isometric view of a headlamp as presented in FIG. 1, showing a white diode and a color changing diode on the body of the headlamp.

As is shown in FIGS. 3 and 4, the headlamp 12, including the LED driver 28 and the associated inputs may be seen in more detail. A circuit board 50 may support both the white diode 26 and the color changing diode 22. The circuit board 50 may be secured to the lamp body 24 at a chip support 52 located on the lamp body 24. The chip support 52 may provide electrical communication from both the color input 14 and the white input 16 to the lamp body 24 by way of the communication wires 54. The circuit board 50 may be provided on one or more sides of the lamp body 24, each circuit board 50 may include a color changing diode 22 and a white diode 26.

Figure 5:
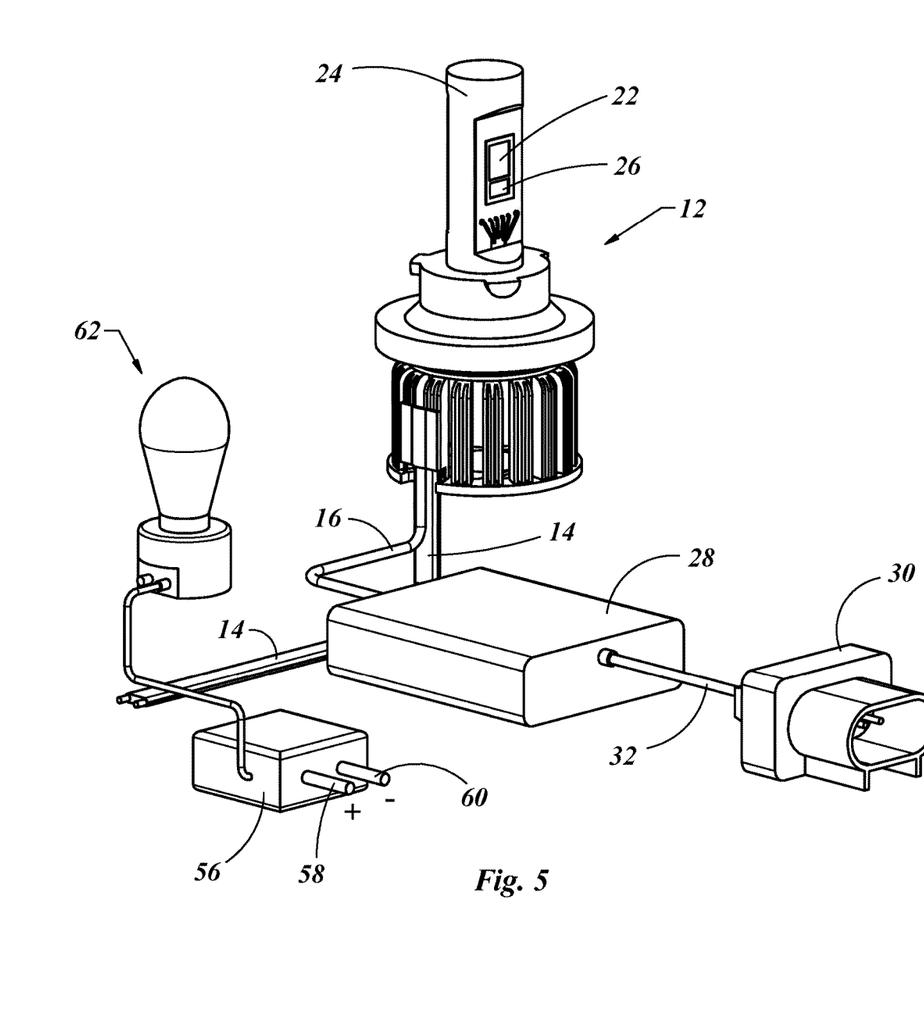
FIG. 5 is an isometric view of a headlamp assembly as presented in FIG. 1 with a turn signal bulb in series with the color input of the headlamp.

As illustrated in FIG. 5, the headlamp 12, including the color changing diode 22 and the white diode 26, is shown in an alternative configuration, which may include input from a secondary system into the color input 14. The white diode 26 may still be controlled by way of the white input 16 and the LED driver 28 from the vehicle by way of the vehicle plug 30, as previously shown and described. As an alternative to the controller 34 (FIG. 1), an electrical input may be provided by way of a vehicle controller 56, which may already be available in the automobile. The vehicle controller 56 may receive power input through the positive lead 58 and the negative lead 60. When input is provided to the vehicle controller 56 to operate a vehicle system such as a secondary light, which may include a turn signal 62, the color changing diode 22 may be placed in series communication with the turn signal 62 by way of the color input 14. In this way, when a driver of the vehicle actuates the turn signal 62, the color changing diode 22 of the headlamp 12 may also be illuminated in a similar color and/or flashing sequence. This may further alert the driver of another vehicle or a pedestrian as to the intended movement of the vehicle using the headlamp 12 as shown.

In a similar manner, the turn signal 62 may function as an emergency flasher, thus signaling the vehicle is in a circumstance that requires additional attention by other drivers or requires emergency assistance. By having the color changing diode 22 provide additional illumination in addition to the turn signal 62, this may aid in communicating the location and presence of this vehicle to others and thus avoid an accident.

The system as shown in all forms in this disclosure may also be used for a purely decorative purpose. In showing a vehicle for the purpose of selling or displaying that vehicle, the more attention you can bring to that vehicle, the greater the chances a sale can be made. Providing illumination from the color changing diode 26 in the headlamp 12 of the vehicle may greatly increase the likelihood of being noticed. The color changing diode 26 may include a virtually infinite number of outputs varying the color, intensity and the illumination patterns. This may allow a vehicle owner to provide nonverbal communication to others with a line of sight to the vehicle, thus drawing the desired attention to the vehicle for any reason. This may be especially valuable for an emergency vehicle, such as police, fire or an ambulance.

Figure 6:
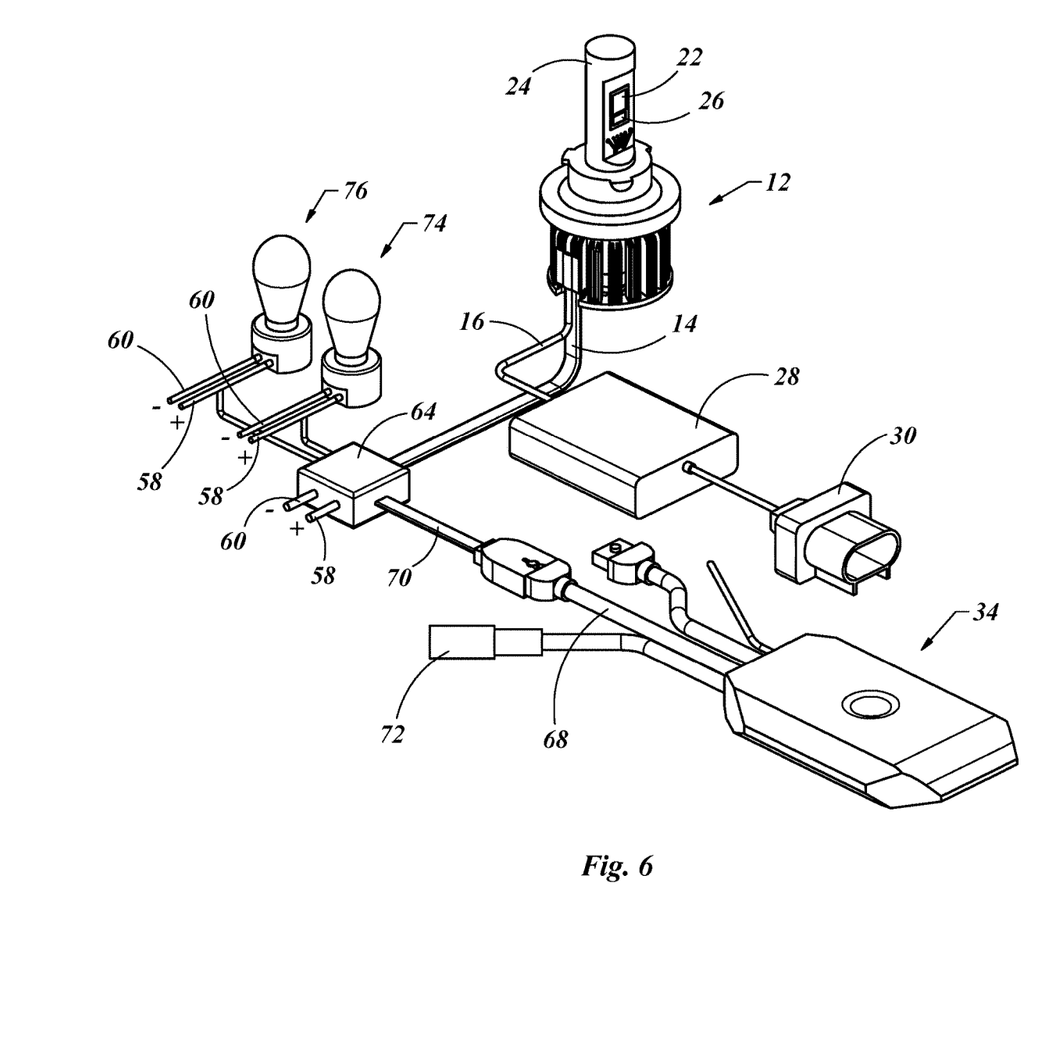
FIG. 6 is an isometric view of a headlamp as presented in FIG. 1 with two auxiliary lamps, such as a turn signal bulb and a running light bulb, connected to the headlamp assembly.

Another embodiment of a use of the headlamp 12 is shown in FIG. 6. The headlamp 12 may include a color changing diode 22 and a white diode 26 as previously disclosed. The white input 16 may be connected to a LED driver 28, which may then be connected to the headlamp circuit of the automobile via the vehicle plug 30. The color input 14 may run in parallel to the white input 16. The junction box 64 may connect to the color input 14. This junction box 64 may include a positive lead 58 and a negative lead 60, which may connect to a DC power supply from the vehicle or another source. A controller 34 may connect to the junction box 64 by way of a controller cable 68 from the controller 34 being connected to a junction box cable 70. The controller 34 may be powered by an electrical source, which may also be a DC power source, through a power cable 72. The controller 34 may receive a wired or wireless communication from an electronic device such as a smart phone or other computer device (not shown). The communication to the controller 34 may allow a user to couple one or more auxiliary lights to the headlamp 12 by way of the color input 14.

A pair of lights is shown in FIG. 6 as being representative of one or more auxiliary lights. In this embodiment, a secondary light may include a turn signal light 74 and a clearance light 76 are shown to be in electrical communication with the junction box 64 and both provided a positive lead 58 and negative lead 60 similar to that of the junction box 64. For the purposes of this disclosure, the turn signal light 74 and the clearance light 76 may be a simple incandescent light, a white light emitting diode (LED) or comprised of a color changing light emitting diode (LED).

It is important to clarify the single light of the turn signal 74 and the clearance light 76 would each likely be multiple lights in a vehicle. Also, the limitation of these lights specifically functioning as a turn signal or clearance light is not required. Any such light or multiple lights in a vehicle could be used to operate in a similar manner.

The function of the turn signal light 74, or the clearance light 76, may operate as would be typically used in any vehicle without the controller 34. The electrical system of the vehicle may send a current to complete the circuit to one or both the turn signal light 74 or the clearance light 76 at any time. The controller 34 may receive a signal from the user to provide any number of varied color outputs from the color changing diode 22. The junction box 64 may allow the system to split this signal to allow for a similar light output from the turn signal light 74 or the clearance light 76. This may allow the turn signal light 74, the clearance light 76 or both, to illuminate with the same color(s) and pattern(s) as that of the color changing diode 22 of the headlamp 12.

This may be especially useful in a number of applications. One such application may be for use with emergency vehicles. In an emergency situation, an emergency vehicle may be required to travel at high rates of speed while traversing normal traffic. It is important for the emergency vehicle in this condition to be highly visible so that other drivers may recognize and then provide a wide birth to the faster moving emergency vehicle. The visual signal of as many lights as possible changing colors and possibly changing brightness in some manner may greatly heighten the visible acuity of the emergency vehicle, thereby increasing the safety of everyone.

The foregoing detailed description of the present invention is provided for purposes of illustration, and it is not intended to be exhaustive or to limit the invention to the particular embodiment shown. The embodiments may provide different capabilities and benefits, depending on the configuration used to implement key features of the invention.

What is claimed is:

1. A vehicle headlamp including:
a lamp body including a chip support;
a color changing light emitting diode (LED) and a white light emitting diode (LED) each mounted on the chip support of the lamp body; and
a first input and a second input, the first input in electrical communication with the color changing light emitting diode (LED) and the second input in electrical communication with the white light emitting diode (LED), whereby electrical power provided by a power source in the vehicle to the second input causes illumination of the white light emitting diode (LED) and electrical power provided by a power source in the vehicle to the first input by way of a controller causes controlled illumination of the color changing light emitting diode (LED).

2. The headlamp according to claim 1, wherein the color changing light emitting diode (LED) and the white light emitting diode (LED) are positioned proximate to one another.

3. The headlamp according to claim 2, wherein one edge of the color changing light emitting diode (LED) is in physical contact with one edge of the white light emitting diode (LED).

4. The headlamp according to claim 2, wherein one edge of the color light emitting diode (LED) is less than 0.050 inches from one edge of the white light emitting diode (LED).

5. The headlamp according to claim 1, wherein the color changing light emitting diode (LED) is a RGB diode which includes the ability to illuminate the colors of red, green and blue in varied intensities of each color.

6. The headlamp according to claim 1, wherein the color changing light emitting diode (LED) is comprised of separate red, blue and green diodes.

7. A headlamp assembly for use in an automobile, the headlamp assembly comprising:
 a headlamp with a lamp body including a chip support;
 a color changing light emitting diode (LED) proximate a white light emitting diode (LED) both mounted to the chip support of the headlamp;
 a controller in electrical communication with the color changing light emitting diode (LED) of the headlamp, the controller providing controlled illumination of the color changing light emitting diode (LED);
 a LED driver connected to the white light emitting diode (LED); and
 a vehicle plug connected to the LED driver, whereby a light output may be generated from the white light emitting diode (LED) by way of the LED driver directing an electrical current passing through the vehicle plug, the plug used as an interface between a power source in the automobile and the LED driver.

8. The headlamp assembly according to claim 7, further comprising a switch and a relay, the switch actuating closing the relay to provide a voltage input from the power source to the controller.

9. The headlamp assembly according to claim 8, wherein the controller provides a modulated electrical input to the color changing light emitting diode (LED) resulting in a light emission of the color changing light emitting diode (LED).

10. The headlamp assembly according to claim 7, wherein the controller is in electrical communication with a secondary light connected to the headlamp.

11. The headlamp assembly according to claim 10, wherein the secondary light is a light selected from a group comprising a turn signal and a clearance light, both located on the vehicle.

12. The headlamp assembly according to claim 10, wherein the secondary light is electrically connected to the color changing light emitting diode (LED) on the headlamp.

13. The headlamp assembly according to claim 7, further comprising a junction box including a power input, and input from the controller, the junction box providing an output to at least one secondary light and an output to the color changing light emitting diode (LED) of the headlamp.

14. The headlamp assembly according to claim 13, wherein the secondary light is a light selected from a group comprising a turn signal and a clearance light, both located on the vehicle.

* * * * *